Oct. 1, 1940.  C. D. PETERSON  2,216,322
SYNCHRONIZING CLUTCH
Filed Dec. 13, 1937   3 Sheets-Sheet 1

INVENTOR:
Carl D. Peterson,
BY Bodell & Thompson
ATTORNEYS.

Oct. 1, 1940.  C. D. PETERSON  2,216,322
SYNCHRONIZING CLUTCH
Filed Dec. 13, 1937   3 Sheets-Sheet 2
FIG-2-
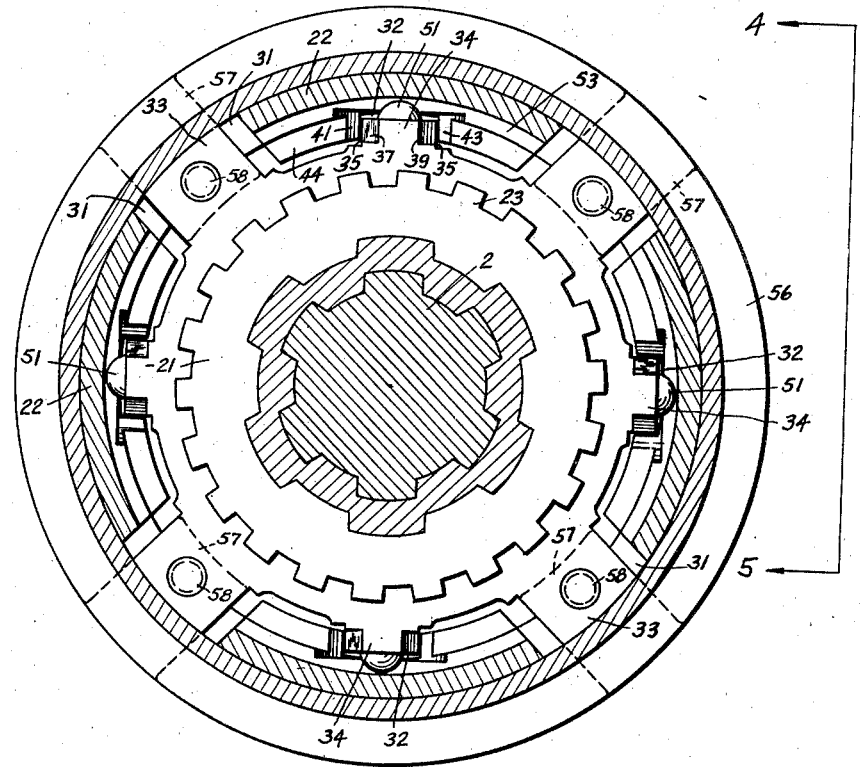
FIG-3-
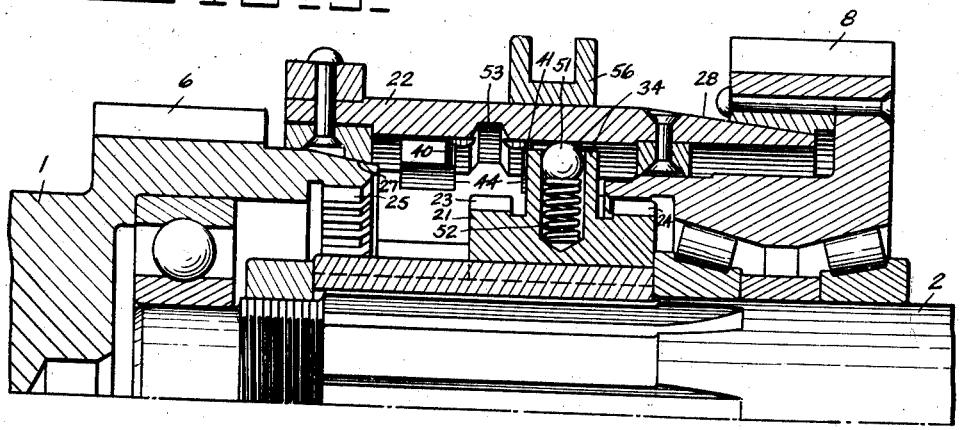
INVENTOR:
Carl D. Peterson,
BY Bodell & Thompson
ATTORNEYS.

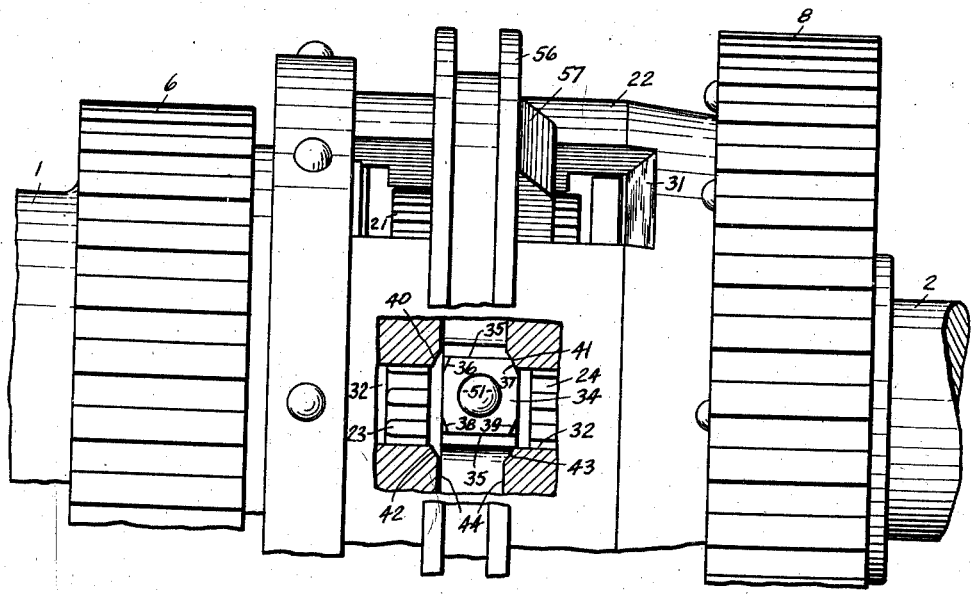
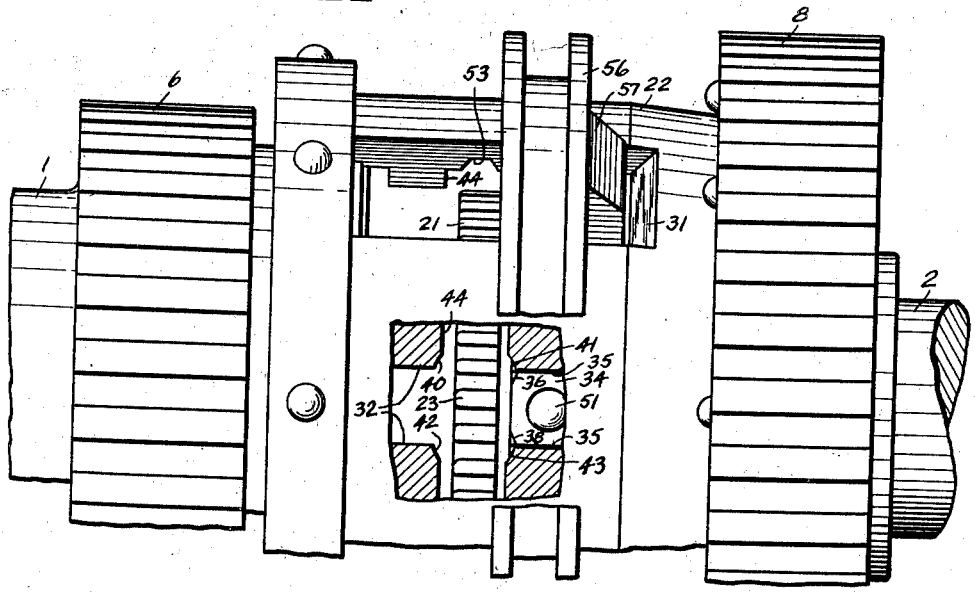

Patented Oct. 1, 1940

2,216,322

UNITED STATES PATENT OFFICE 2,216,322

SYNCHRONIZING CLUTCH

Carl D. Peterson, Toledo, Ohio

Application December 13, 1937, Serial No. 179,405

7 Claims. (Cl. 192—53)

This invention relates to synchronizing clutches for change-speed transmission gearings, and has for its object a particularly simple and compact assembly of synchronizing clutch mechanism embodying means for preventing engagement of the toothed clutch faces of two parts to be coupled together, until the speeds of those parts are synchronized, which means is automatically controlled or operated by the differential speeds and the synchronized speeds of the two members, these means being embodied in the friction and toothed sections themselves in contradistinction to the jaw or teeth to be brought into interlocking engagement.

It further has for its object a construction by which the shifting force applied to the shifting lever assists the synchronizing action while the toothed clutch faces are blocked from coming into engagement by the means of the preceding paragraph.

It further has for its object a synchronizing clutch element including inner and outer sections, the inner section being provided with a toothed clutch face, and the outer section, in the form of a sleeve having a friction clutch face, the sleeve section being shiftable axially of the inner or toothed section, and the two sections having relative circumferential movement, within limits, together with means embodied in the sleeve and the inner section and operated by the relative circumferential movement to block full shifting of the inner section, when the two parts to be clutched together, are rotating at differential speeds and to remove the blocking effect when the speeds of the two parts are synchronized.

Further objects with respect to detail features of the construction will appear throughout the specification.

The invention is illustrated as a double construction and is embodied in a direct drive and second speed indirect drive clutch of a three speed and reverse transmission gearing.

The invention consists in the novel features and in the combinations and constructions herein after set forth and claimed.

In describing this invention, reference is had to the accompanying drawings in which like characters designate corresponding parts in all the views.

Figure 2 is an enlarged sectional view, taken approximately on the plane of line 2—2, Figure 1.

Figure 3 is an enlarged sectional view of the clutch seen in Figure 2.

Figure 1:
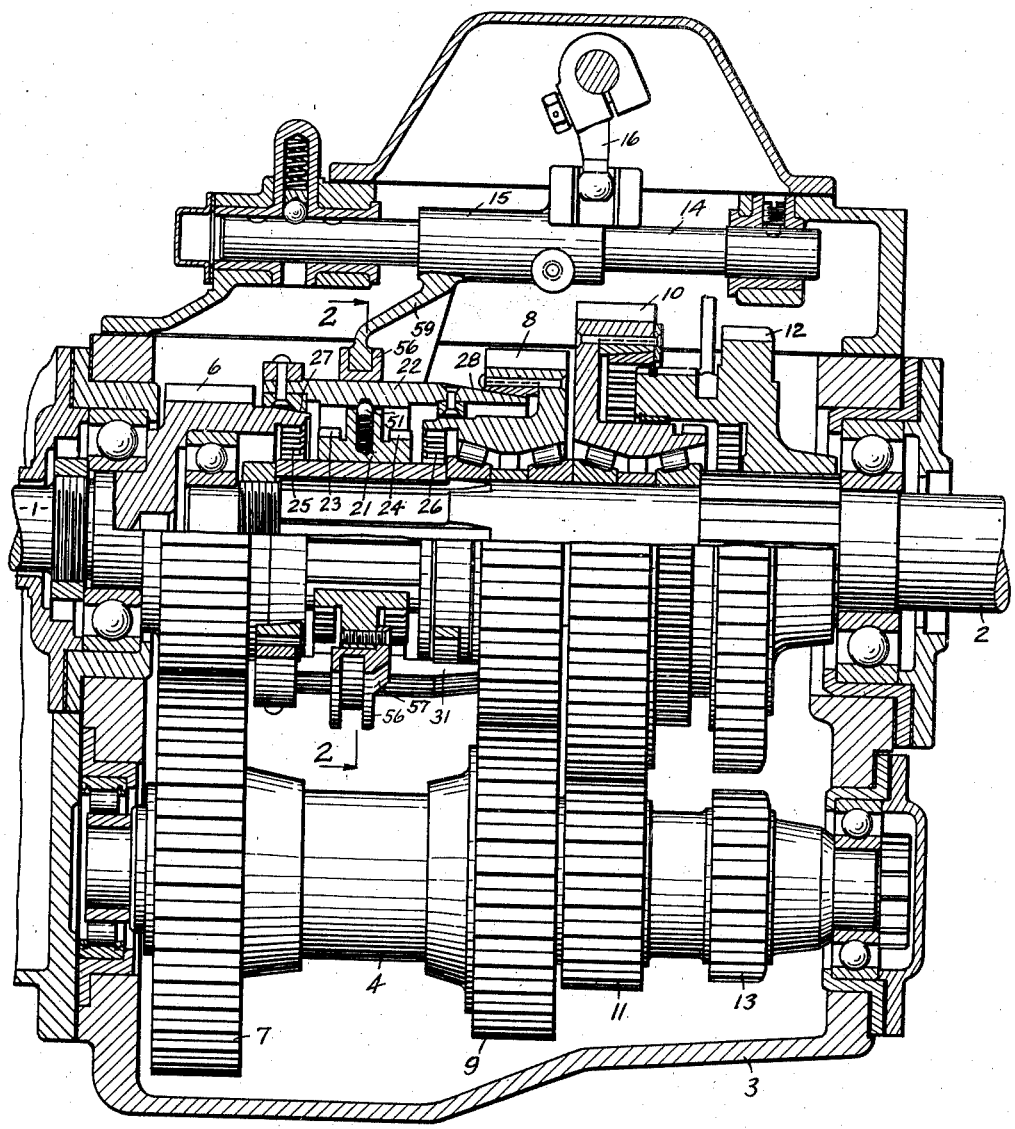
Figure 1 is a vertical sectional view of a transmission gearing embodying my invention.

Figures 4 and 5 are enlarged detail views, partly broken away, looking in the direction of the arrows 4—5 (Figure 2), Figure 4 showing the position of the means for blocking the shifting of the toothed section in its position assumed before the relative speeds of the two parts to be clutched together are synchronized, and Figure 5, the relative position of these parts after the parts are synchronized and the shifting completed.

In Figure 1, 1 and 2 designate respectively the drive or input shaft and the transmission or output shaft of the transmission gearing, these being mounted in axial alinement in the gear box 3. 4 designates the counter shaft having a cluster of gears thereon. Gear 6 is a gear on the inner end of the drive shaft 1 and meshing with a gear 7 on the counter shaft. 8 is a gear on the transmission shaft normally mounted to rotate about said shaft and meshing with the gear 9 on the counter shaft.

10 and 11 are intermeshing gears on the transmission shaft 2 and counter shaft 4 respectively, the gear 10 being likewise mounted on the transmission shaft to normally rotate about the same. 12 and 13 are gears on the transmission shaft and counter shaft respectively meshing with the reverse gear idler, not shown.

The shafts 1, 2 are connected directly together in direct drive relation and the gear 8 clutched to the transmission shaft 2 by the synchronizing clutch mechanism forming the subject matter of this application.

The gears 10 and 13 are also selectively clutchable to the transmission shaft 2 by suitable clutch mechanism which does not form part of this invention.

The shiftable clutch elements of the gearing are shifted by the usual shifter rods, as 14, each having a block, as 15, thereon, for coacting with the selecting and shifting finger 16 of the gear shifting lever having a lateral selecting movement and a fore and aft shifting movement.

The clutch forming the subject matter of this application comprises inner and outer sections 21 and 22, the inner section being mounted on the shaft 2 to rotate therewith and shift axially thereof, it being here shown as slidably splined to the shaft 2. The clutch here shown is of double construction, and the inner section 21 is provided with clutch faces 23, 24 on opposite sides thereof for interlocking respectively with complemental clutch faces 25 and 26 on the shaft 1 or the gear 6 thereof and on the gear 8. The outer section 22 is in the form of a sleeve having friction faces, as conical faces 27 and 28, at opposite ends thereof for coacting with complemental friction faces on the shaft 1 or the gear 6 and on the gear 8, this section 22 being the friction synchronizing section. The section or sleeve 22 is mounted to shift axially relatively to the inner section 21, and means, as impositive locking means, or spring-pressed poppets are provided for impositively coupling the two sections together, so that they move, as a unit, and permit the inner toothed section 21 to be shifted axially relatively to the outer sleeve section 22, when the movement of the sleeve 22 is stopped by reason of the engagement of its friction face 27 or 28 with the complemental friction faces of the gear 6 or the gear 8, in accordance with the direction of the shifting. The sections 21 and 22 are also assembled to have a relative circumferential movement, within limits, this occurring during the synchronizing action of the friction clutch face 27 or 28, with the complemental friction face of the gear 6 or the gear 8. The circumferential movement or play operates the means embodying the sleeve 22 and the inner section 21 for blocking the shifting of the section 21, and hence the engagement of its clutch face 23 or 24 with the complemental toothed clutch face 25 or 26, until the speed of the section 21 is synchronized with that of the gear 6 or 8, through the friction face 27 or 28.

The outer or friction clutch section 22 is provided with two sets of lengthwise slots 31, internal lengthwise grooves 32. The inner section 21 is provided with posts or peripheral projections 33 extending into the slots 31 and of less width than the same, as seen in Figure 2, to permit relative circumferential movement of the sections 21 and 22, within limits. The inner section 21 is also provided with peripheral or radial projections or posts 34 extending into the grooves 32 and having heads or cam faces 35 thereon which slidably fit the grooves 32 without appreciable circumferential movement. These cam faces 35 have beveled or chamferred corners 36, 37, 38 and 39. The entrances of the grooves 32 are wider than the grooves and chamferred, as shown at 40, 41, 42 and 43 (Figures 4 and 5). For convenience in forming or machining the wider entrances of the grooves, an internal annular groove 44 is machined out of the inner face of the sleeve 22 intersecting the groove 32 and also incidentally the slot 31 at the intersection of the annular groove 44 and the groove 32 chamferred, beveled or machined off at 40, 41, 42 and 43 to provide the wider tapering entrances. The posts 34 with the heads or cams 35, grooves 32 and their funnel shaped or chamferred entrances constitute means embodied in the inner toothed and outer friction sections for preventing the jaw or toothed clutch faces from being brought together until the speeds are synchronized and the jaw or toothed faces properly alined.

The inner and outer sections 21 and 22 are yieldingly or impositively coupled together, so that they shift as a unit, until the shifting movement of the outer sleeve 22 is stopped, by spring-pressed poppets, as balls 51 located in radial sockets in the section 21 and in the cam post 34, the balls being urged outwardly by springs 52 in the sockets and coacting with a notch 53 in the inner face of the sleeve 22 and in the bottoms of the grooves 32. These notches have inclined sides to permit the poppets to be cammed out of the notches, when sufficient shifting force is applied to the section 21, after the section 22 has been stopped in its shifting movement and the cam blocks have been moved into exact alinement with the grooves 32, this occuring when the speeds of the two parts to be clutched have been synchronized by the action of the friction section or sleeve 22 on the friction face of the gear 6 or 8. For convenience, these notches are formed in the bottoms of grooves 32 by machining internal annular grooves in the inner face of the sleeve 22.

The shifting of the section 21 is effected by means of a collar 56 encircling the section or sleeve 22 and having inwardly extending or radial lugs 57 (see Figures 1 and 2) extending through the slots 31 and lapping the post 33 and secured thereto, as by screws 58. The collar (as seen in Figure 1) coacts with a fork 59 on one of the shifter blocks 15.

Certain features pertinent to supporting and centering the outer or sleeve section 22, shown but not described herein, constitute the subject matter of Peterson application, Serial No. 267,272 filed April 11, 1939.

In operation, assuming that the input shaft revolves over to the right when viewed at the front or left hand side of the mechanism in Figure 1, and a shift is to be made from first or low to second gear, or that a shift is to be made, requiring the gear 8 to be clutched to the transmission shaft 2 and the drive through the gears 6, 7, 9 and 8, the operator applies force to the shifting lever to shift the collar 56 to the right (Figure 1, 3 and 4) from neutral, shifting both sections 21, 22 as a unit, bringing the clutch face 28, at the right hand end of the sleeve 21, into friction motion-transmitting engagement with the clutch face of the gear 8. The transmission shaft 2 is thus rotating at a lower speed than the gear 8, which is being driven from the drive shaft 1 through the gears 6, 7, counter shaft 4, and gear 9, so that the clutch section 21 and shaft 2 are in effect, lagging behind the gear 8. This causes relative circumferential movement in a reverse direction of the inner toothed section 21 relatively to the outer section 22 or a relative forward rotation of the section 22 relatively to the section 21, this being permissible due to the fact that the projections or posts 33 are of less width than the slots 31. This relative rotation of parts 21 and 22 causes the cam blocks 34 to take the position shown in Figure 4, in which the chamfered corner 37 is blocked against the chamfered corner 41 at the entrance of the groove 32, so that further shifting of the section 21 to engage its teeth 24 with the clutch teeth 26 of the gear 8 is blocked. Additional shifting pressure applied through the gear shifting lever to the collar 56 synchronizes the speed of the shaft 2 and gear 8 and causes the section 22 to rotate at or more nearly the same speed as the gear 8 and transmits its motion through the post 33 to the clutch section 21 and the shaft 2, and hence set up a slight circumferential movement in a forward direction, thus dislodging the cam block from out of engagement with the chamfered face at 42 or out of the position shown in Figure 4 or relieving the differential circumferential force or push against the cam block so that they can be easily pushed through the tapering or funnel shaped entrance of the grooves 32 by the continued application of shifting force to the shifting lever (Figure 5), this permitting the clutch faces 24 and 26 to interlock smoothly. During this last shifting movement of the section 21 to interlock the teeth 24 and 26, the spring-pressed poppets 51 are dislodged out of the notch 53 and occupy the position shown in Figure 3. An analogous action takes place when shifting from high to second or second to high and from second to low.

In shifting from high to second, the chamfered corner 39 of the cam block 34 is blocked by the corner 43 of the entrance of the groove 32 until the speeds are synchronized. In shifting from second to third or high, the chamfered corner 36 of the shifting block 34 is blocked by the chamfered corner 40 of the widened entrance of the groove 32, until the speeds are synchronized. When the shift is made from second to high, the friction face 27 of the outer section or sleeve 22 coacts with the complemental friction face of the gear 6 prior to the time the clutch teeth 23 are brought into clutching engagement with the complemental clutch teeth 25 on the gear 6 and when the shift is being made from third or high to second, the friction clutch face 28 of the section or sleeve 22 coacts with the complemental friction face of the gear 8 preliminary to the clutching engagement of the clutch faces 24 and 26.

As this clutch controls shifting into high or third speed from low or second speed, and shifting into second speed from high or low, the chamfered entrance at 42 is not used. It is available for use if a speed, as over-drive, is used, and a shift is made from over-drive to third speed.

What I claim is:

1. In a change-speed transmission gearing including a shaft and an element to be clutched thereto and having a friction clutch face and a toothed clutch face; of a clutch element including a toothed section rotatable with the shaft and shiftable axially thereof and having a toothed face for interlocking with the former toothed clutch face, and a friction section in the general form of a sleeve encircling and slidably mounted on the toothed section and having a friction face for coacting with the former friction face, and being also formed with a lengthwise slot, and the toothed section having a peripheral projection extending into the slot and of less width than the same for permitting relative circumferential movement, within limits, of the sections, means connected to said peripheral projection for shifting the first section axially, means for yieldingly transmitting the shifting movement of the toothed section to the friction section and permitting relative axial movement of the toothed section, after the shifting movement of the friction section has been stopped, and means embodied in the sleeve and toothed sections for blocking shifting movement of the toothed section during differential rotation of said elements.

2. In a change-speed transmission gearing including a shaft and an element to be clutched thereto and having a friction clutch face and a toothed clutch face; of a clutch element including a toothed section rotatable with the shaft and shiftable axially thereof and having a toothed face for interlocking with the foormer toothed clutch face, and a friction section in the general form of a sleeve encircling and slidably mounted on the toothed section and having a friction face for coacting with the former friction face, and being also formed with a lengthwise slot, and the toothed section having a peripheral projection extending into the slot and of less width than the same for permitting relative circumferential movement, within limits, of the sections, means for shifting the first section axially, means for yieldingly transmitting the shifting movement of the toothed section to the friction section and permitting relative axial movement of the toothed section, after the shifting movement of the friction section has been stopped, and means embodied in the sleeve and toothed sections for blocking shifting movement of the toothed section during differential rotation of said elements, the shifting means including a collar encircling the sleeve and connected to said projections on the toothed section.

3. In a change-speed transmission gearing including a shaft, and an element to be clutched to the shaft and having a friction face and a toothed face; of a clutch element including a toothed section rotatable with the shaft and shiftable axially thereof and having a toothed face for interlocking with the former toothed face, and a friction section in the general form of a sleeve encircling and slidably mounted on the toothed section and having a friction face coacting with the former friction face and being formed with a lengthwise groove having a wide entrance, and the toothed section having a radial post extending into the groove and slidably fitting the same and being normally arranged in the wider entrance and being of less width than the wider entrance permitting relative circumferential movement of the section, means for shifting the toothed section axially, means for yieldingly transmitting the shifting movement of the toothed section to the friction section and permitting relative axial movement of the toothed section, after the shifting movement of the friction section has been stopped, the walls of the entrance and the post having coacting chamfered faces at their corners for normally blocking shifting movement of the toothed section, until the speeds of the two elements to be clutched together are synchronized through the clutch faces, the wider entrances permitting relative circumferential movement of the sections to bring the chamfered surfaces into engagement, the sleeve also having an additional lengthwise slot and the toothed section a peripheral projection in the latter slot and of less width than the same, and the shifting means including a collar around the sleeve and secured to the projection.

4. In a change-speed transmission gearing including a shaft and an element to be clutched thereto and having a friction clutch face and a toothed clutch face; of a clutch element including a toothed section rotatable with the shaft and shiftable axially thereof and having a toothed face for interlocking with the former toothed clutch face, and a friction section in the general form of a sleeve encircling and slidably mounted on the toothed section having a friction face for coacting with the former friction face and being also formed with lengthwise slots, the toothed section having peripheral projections extending into one of the slots and of less width than the same for permitting relative circumferential movement, within limits, of the friction section and the toothed section also having a radial projection extending into the other groove, and slidably fitting the same, this groove having an entrance wider than the slot, forming shoulders at the entrance corners of the latter groove, means for shifting the toothed section axially, means between the sections for yieldingly transmitting the shifting movement of the toothed section to the friction section and permitting relative axial movement of the sections after the shifting movement of the friction section has been stopped, said radial projection and the shoulders constituting means operable by the relative circumferential movement for blocking the sections from relative axial movement until the speeds of the elements have been synchronized through the friction faces.

5. In a change-speed transmission gearing including a shaft and an element to be clutched thereto and having a friction clutch face and a toothed clutch face; of a clutch element including a toothed section rotatable with the shaft and shiftable axially thereof and having a toothed face for interlocking with the former toothed clutch face, and a friction section in the general form of a sleeve encircling and slidably mounted on the toothed section having a friction face for coacting with the former friction face and being also formed with a lengthwise slot, the toothed section having a peripheral projection extending into the slot and of less width than the same for permitting relative circumferential movement, within limits, of the sections, and the toothed section also having a radial projection extending into the other groove, and slidably fitting the same, this groove having an entrance wider than the slot forming shoulders at the entrance corners of the groove, and the radial projection being normally located in the wider entrance, means for shifting the toothed section axially, means between the sections for transmitting the shifting movement of the toothed section to the friction section and permitting relative axial movement of the sections after the shifting movement of the friction section has been stopped, said radial projection and the shoulders constituting means operable by the relative circumferential movement for blocking the sections from relative axial movement until the speeds of the elements have been synchronized through the friction faces.

6. A synchronizing clutch for change-speed gearing comprising an inner section having a toothed clutch face and an outer section in the form of a sleeve encircling the inner section, the sleeve being formed with a friction face arranged to engage the part to be clutched in advance of the toothed face, the sleeve being formed with lengthwise slots and lengthwise grooves and the grooves being formed with entrances wider than the grooves, the inner section having radial cam posts slidably fitting the grooves and normally arranged in the wider entrances, the cam posts and the wider entrances having coacting tapering corners at the ends of the grooves, means for shifting the inner section including a collar slidable on the outer section and radial posts connecting the collar and the inner section and extending through the slots and being of less width than the same, the slots and the wider entrances of the grooves permitting the relative circumferential movement, within limits, of the sleeve and the inner section, and spring-pressed poppets normally impositively coupling the sleeve and the inner section together and permitting shifting movement of the inner section relatively to the sleeve when the shifting movement of the sleeve is stopped by reason of the engagement of its friction face with the part to be clutched.

7. A synchronizing clutch for change-speed gearing comprising an inner section having a toothed clutch face and an outer section in the form of a sleeve encircling the inner section, the sleeve being formed with a friction face arranged to engage the part to be clutched in advance of the toothed face, the sleeve being formed with lengthwise slots and lengthwise grooves and the grooves being formed with entrances wider than the grooves, the inner section having radial cam posts slidably fitting the grooves and normally arranged in the wider entrances, the cam posts and the wider entrances having coacting tapering corners at the ends of the grooves, means for shifting the inner section including a collar slidable on the outer section and radial posts connecting the collar and the inner section and extending through the slots and being of less width than the same, the slots and the wider entrances of the grooves permitting the relative circumferential movement, within limits, of the sleeve and the inner section, and spring-pressed poppets normally impositively coupling the sleeve and the inner section together and permitting shifting movement of the inner section relatively to the sleeve when the shifting movement of the sleeve is stopped by reason of the engagement of its friction face with the part to be clutched, said spring-pressed poppets being located in the cam posts and pressing radially outwardly against the sleeve.

CARL D. PETERSON.